United States Patent
Bonnländer et al.

(10) Patent No.: US 12,551,520 B2
(45) Date of Patent: Feb. 17, 2026

(54) MAQUI BERRY EXTRACTS FOR TREATMENT OF SKIN DISEASES

(71) Applicant: Anklam Extrakt GmbH, Anklam (DE)

(72) Inventors: Bernd Bonnländer, Schwaig (DE); Stefanie Lang, Nuremberg (DE)

(73) Assignee: Anklam Extrakt GmbH, Anklam (DE)

( * ) Notice: Subject to any disclaimer, the term of this patent is extended or adjusted under 35 U.S.C. 154(b) by 992 days.

(21) Appl. No.: 17/608,490

(22) PCT Filed: May 4, 2020

(86) PCT No.: PCT/EP2020/062300
§ 371 (c)(1),
(2) Date: Nov. 3, 2021

(87) PCT Pub. No.: WO2020/225202
PCT Pub. Date: Nov. 12, 2020

(65) Prior Publication Data
US 2022/0211788 A1    Jul. 7, 2022

(30) Foreign Application Priority Data
May 3, 2019   (EP) .................................... 19172658

(51) Int. Cl.
A61K 36/185    (2006.01)
A23L 33/105    (2016.01)

(52) U.S. Cl.
CPC .......... *A61K 36/185* (2013.01); *A23L 33/105* (2016.08); *A61K 2236/333* (2013.01)

(58) Field of Classification Search
None
See application file for complete search history.

(56) References Cited

U.S. PATENT DOCUMENTS

| | | |
|---|---|---|
| 2009/0142424 A1 | 6/2009 | Avila |
| 2015/0148944 A1 | 5/2015 | Chatterjee |
| 2015/0164932 A1 | 6/2015 | Burgos et al. |
| 2017/0027853 A1 | 2/2017 | Morariu |

FOREIGN PATENT DOCUMENTS

| | | |
|---|---|---|
| JP | 2006-515372 A | 5/2006 |
| JP | 2010-189288 A | 9/2010 |
| JP | 2013-508347 A | 3/2013 |
| JP | 2013-234141 A | 11/2013 |
| JP | 2014-221751 A | 11/2014 |
| KR | 10-1892865 B1 | 8/2018 |
| WO | 2004/087129 A1 | 10/2004 |
| WO | 2011/048479 A2 | 4/2011 |
| WO | 2013/022788 A1 | 2/2013 |
| WO | 2018/157151 A1 | 8/2018 |

OTHER PUBLICATIONS

Hidalgo et al., Delphinol standardized maqui berry extract reduces postprandial blood glucose increase in individuals with impaired glucose regulation by novel mechanism of sodium glucose cotransporter inhibition, 2014, Panminerva Med, 56: 1-7.*
Pal et al., "Topical application of delphinidin reduces psoriasiform lesions in the flaky skin mouse model by inducing epidermal differentiation and inhibiting inflammation", British Journal of Dermatology, vol. 172, No. 01, 2015, pp. 354-364.
Teresa et al., "Anthocyanins in Berries of Maqui (Arisfotelio chilensis (Mol.) Stuntz)", Phytochem. Anal, vol. 17, No. 1, 2006, pp. 8-14.
Addor et al., "Improvement of dermal parameters in aged skin after oral use of a nutrient supplement", Clinical Cosmetic and investigational Dermatology, vol. 11, Apr. 1, 2018, pp. 195-201.
Database WPI Week 201863, Thomson Scientific, London, GB; AN 2018-68713G, 2017, 1 page.
International Preliminary Report on Patentability received for PCT Patent Application No. PCT/EP2020/062300, mailed on Jul. 20, 2021, 12 pages.
International Search Report and Written Opinion received for PCT Patent Application No. PCT/EP2020/062300, mailed on Aug. 24, 2020, 10 pages.
Watson et al., "Nutraceutical and antioxidant effects of a delphinidin-rich maqui berry extract DelphinolR: a review", Minerva Cardioangiol, vol. 63, Suppl. 1 to No. 2, Apr. 1, 2015, pp. 1-12.

* cited by examiner

Primary Examiner — Terry A McKelvey
Assistant Examiner — Catheryne Chen
(74) Attorney, Agent, or Firm — Faegre Drinker Biddle & Reath LLP

(57) ABSTRACT

The present invention relates generally to maqui berry for use in the treatment or prevention of skin diseases, wherein maqui berry may be the primary natural active ingredient. Particular embodiments as disclosed herein find application in, inter alia, the prophylaxis and the treatment of skin diseases, in particular, dermatitis, atopic dermatitis (neurodermatitis), dermatitis solaris, eczema, hand eczema, lichen planus, lupus erythematosus, psoriasis, urticaria, itching, scabies, age spot, freckles and dry/atopic skin of humans. In particular, the present invention relates to the use of maqui berry extract in the manufacture of a medicament or dietary supplement for use in treating or preventing said skin diseases or defects.

14 Claims, 4 Drawing Sheets

Figure 1 - Delphinol® enhances glucose uptake in keratinocytes.
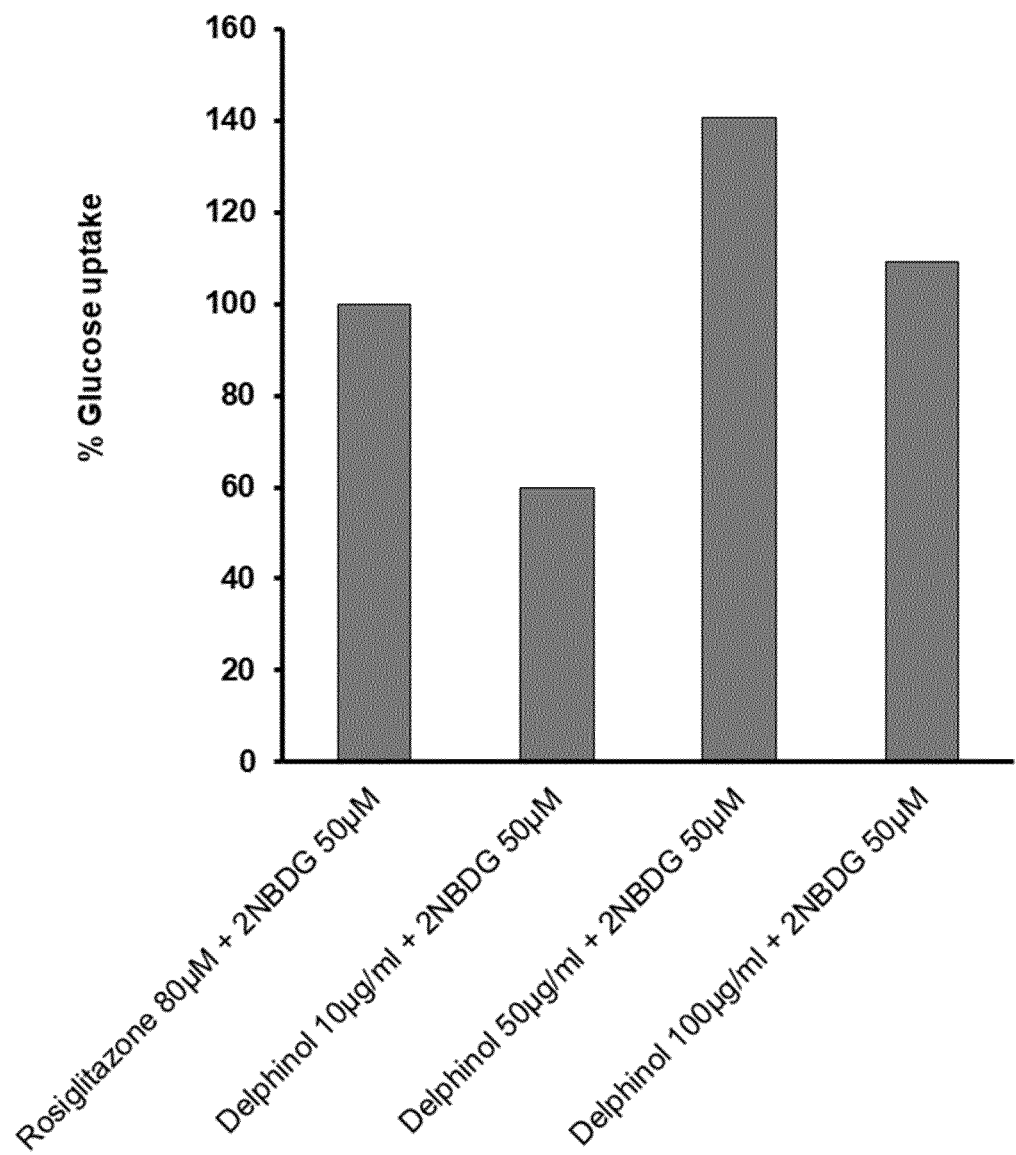

Figure 2 - Delphinol® has beneficial effects on sensitive skin conditions.
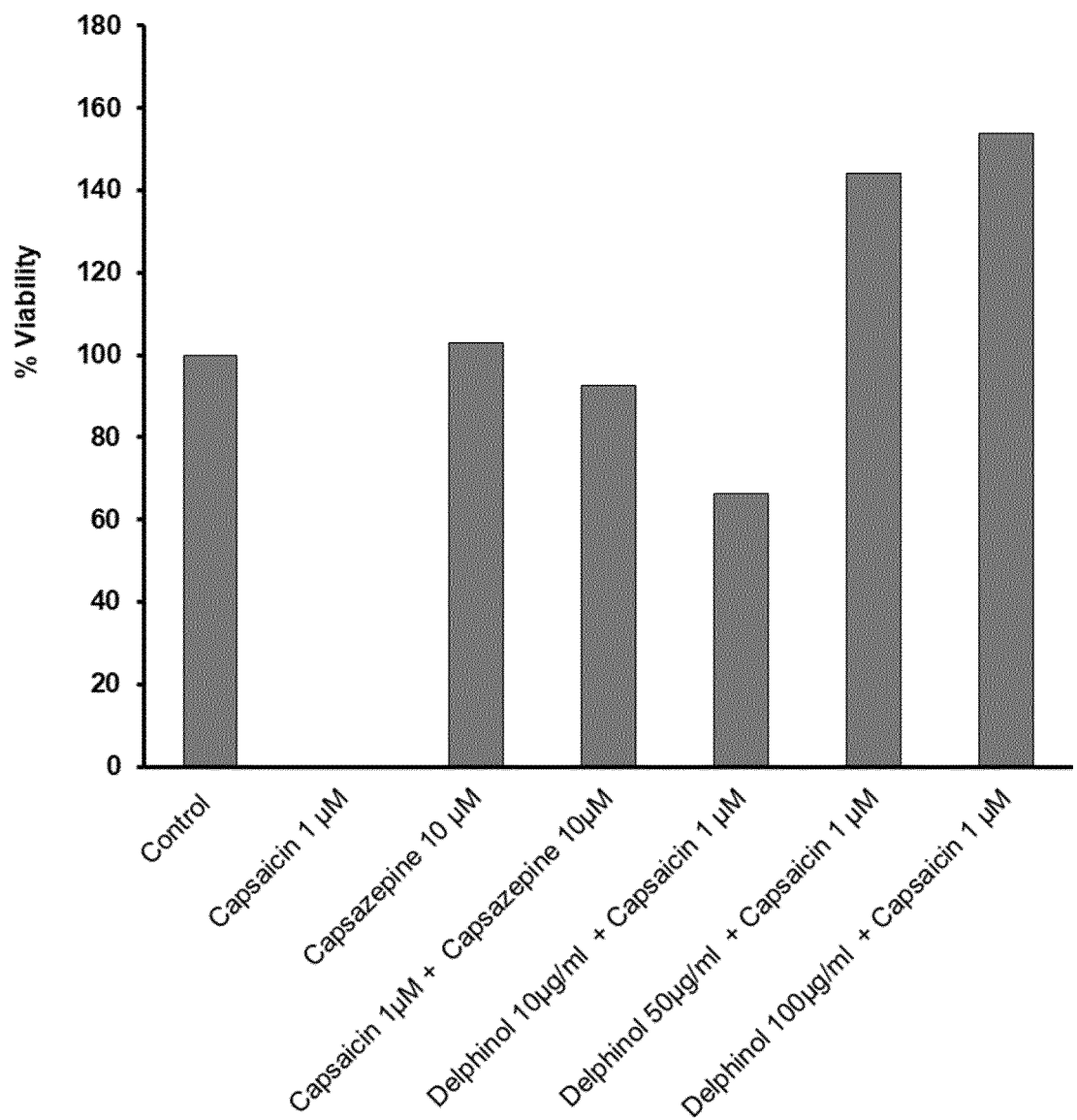

Figure 3 – Delphinol® demonstrates anti-inflammatory action upon immuno-stimulation of fibroblast.
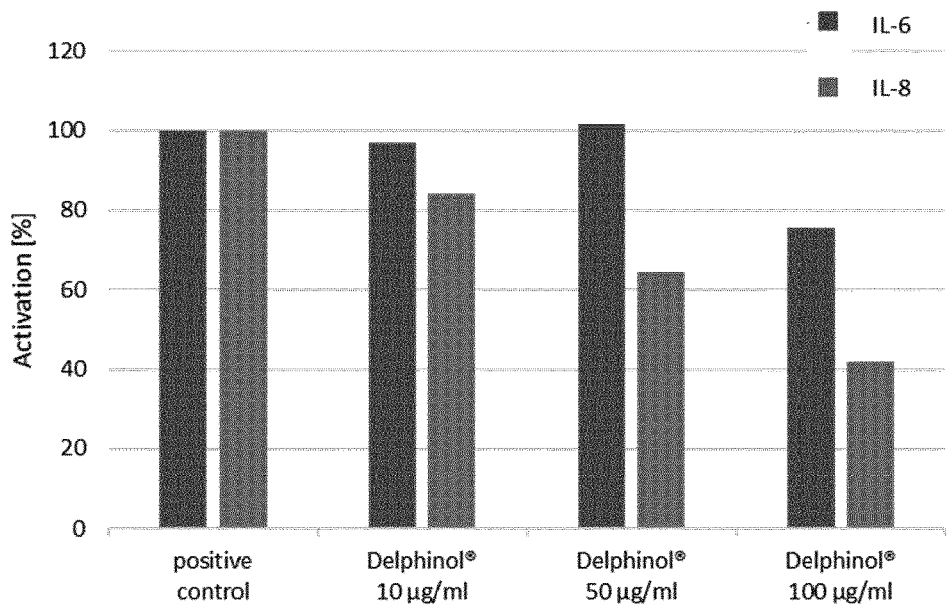
Left column IL-6, right column IL 8
Figure 4 – Delphinol® potently inhibits collagen fibres-degrading enzyme MMP-1 in keratinocytes.
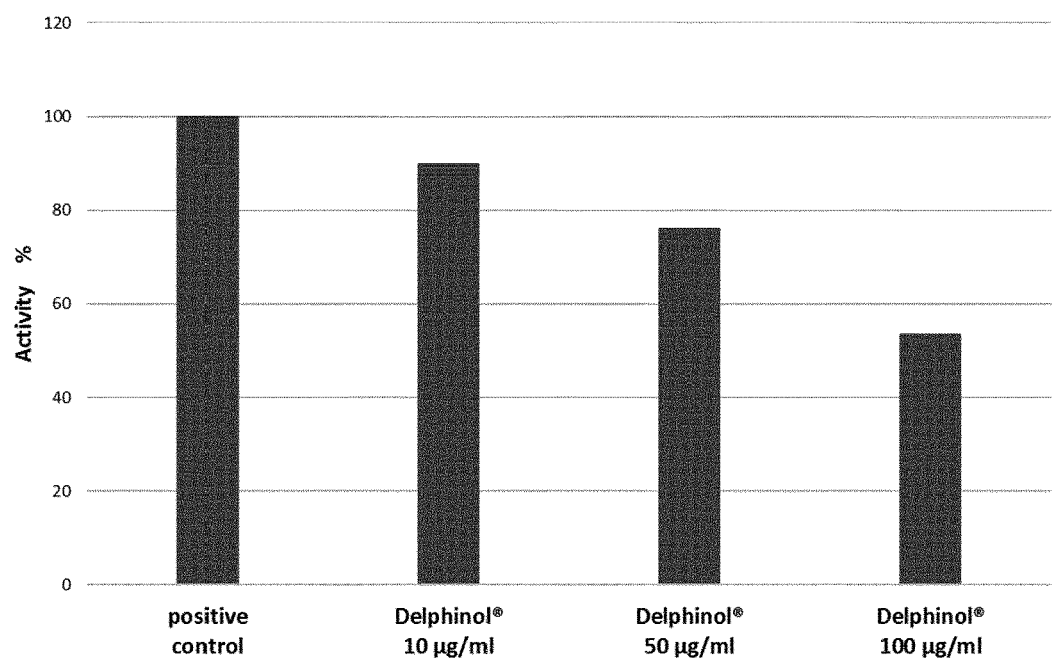

Figure 5 – Delphinol® dose-dependently inhibits tyrosinase activity and lowers melanin production in vitro.
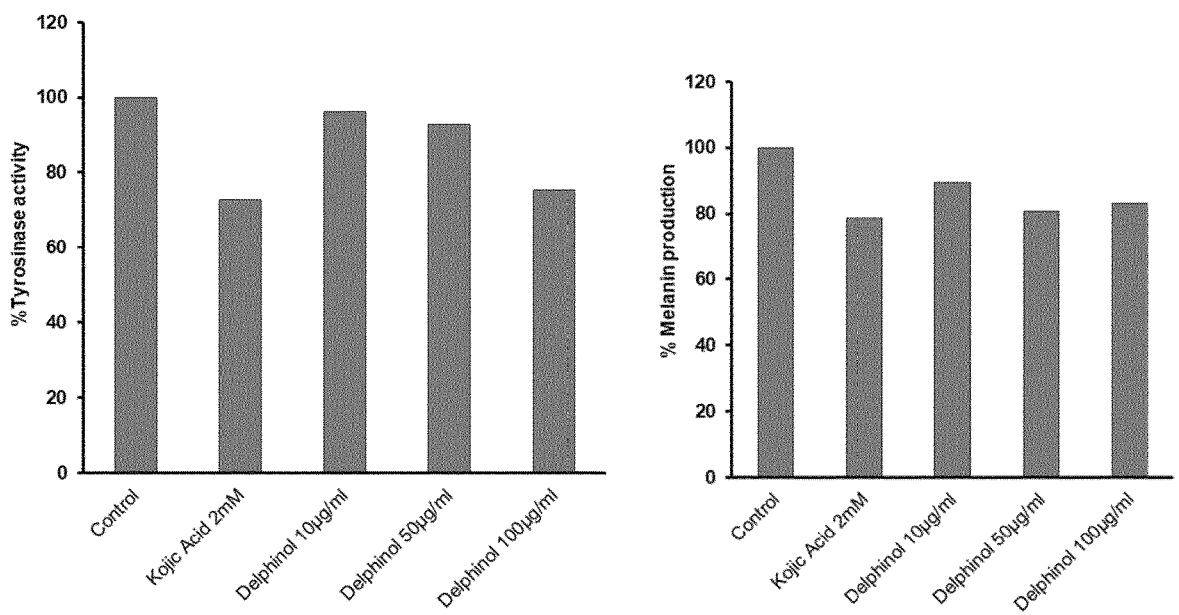

MAQUI BERRY EXTRACTS FOR TREATMENT OF SKIN DISEASES

CROSS-REFERENCE TO RELATED APPLICATIONS

This application is a national stage application (under 35 U.S.C. § 371) of PCT/EP2020/062300, filed May 4, 2020, which claims benefit of European Application No. 19172658.7, filed May 3, 2019, both of which are incorporated herein by reference in their entirety.

The present invention relates generally to maqui berry for use in the treatment or prevention of skin diseases, wherein maqui berry may be the primary natural active ingredient. Particular embodiments as disclosed herein find application in, inter alia, the prophylaxis and the treatment of skin diseases, in particular, dermatitis, atopic dermatitis (neurodermatitis), dermatitis solaris, eczema, hand eczema, lichen planus, lupus erythematosus, psoriasis, urticaria, itching, scabies, age spot, freckles and dry/atopic skin of humans. In particular, the present invention relates to the use of maqui berry extract in the manufacture of a medicament or dietary supplement for use in treating or preventing said skin diseases or defects.

As the largest organ of humans, the skin performs a variety of vital functions. For example, it offers protection from the cold, heat, from radiation, the effects of chemical substances, and pathogens. When the skin no longer sufficiently performs this barrier function, local irritations or even symptoms affecting the entire body may develop.

As the barrier organ of the human organism, the skin, primarily the epidermis, is particularly exposed to external influences. This barrier function is maintained by skin lipids, among other things. These epidermal lipids, such as glycosphingolipids, ceramides, sterols and sterol esters, fatty acids, triglycerides, n-alkanes, or different polar lipids, are released during the ceratinization process.

In an optimal state of the skin, there is a balance between skin lipids and skin moisture. This balance plays a role in determining key properties of the skin, such as the penetration ability, hydration ability, elasticity, regeneration ability, or resistance to environmental influences and a wide variety of toxic agents. Thus, superior importance is attached to the skin lipids, in particular the surface lipids.

The outer lipid film of the skin is formed by an emulsion having a very complex composition of different lipids and the secretion of the perspiratory glands, such as urea, fatty acids, inorganic salts, and water. The constituents of the oil phase are predominantly secretions from the sebaceous glands containing, among other things, squalene, cholesterol and cholesterol esters, wax esters, triglycerides, and free fatty acids.

The maqui berry, also called Chilean wineberry (*Aristotelia chilensis*), is a native berry that only grows in the wild forests of Patagonia localized in Chile and Argentina. Up to now, almost no industrial cultivation does occur and most of the berries are still harvested from wild plants. The Patagonian region is close to the Andes Mountains and exhibits a quite harsh climate cold nights, warm days and intensive UV radiation. These conditions provide maqui berries with a unique phytochemical profile. The small deep purple to black berries have been consumed for centuries by the indigenous Mapuche Indians since the fruits are known for their remarkable health-promoting effects and valuable ingredients. Today next to goji and acai, the maqui berry is regarded as "super fruit" due to its superior antioxidant properties. In Chile, the berries are used for jam, juices, ice cream and liquors and are part of the daily life.

Growing evidence suggests that natural compounds in fruits and vegetables such as polyphenols have a wide range of biological and pharmacological effects.

It is the object of the present invention to provide a composition, in particular a pharmaceutical or nutraceutical, which, in addition to providing skin care, is suited to treat skin diseases, particularly dermatitis, atopic dermatitis (neurodermatitis), dermatitis solaris, eczema, hand eczema, lichen planus, lupus erythematosus, psoriasis, urticaria, itching, scabies, age spot, freckles and dry/atopic skin of humans.

The present inventors have surprisingly found that maqui berry extract disclosed herein promote skin healing and regeneration and combat skin inflammation, in particular inflamed skin conditions.

Hence, disclosed herein is a method for the treatment of inflamed skin conditions in a subject, the method comprising administering to the subject in need thereof an effective amount of an maqui berry extract as defined herein.

A BRIEF DESCRIPTION OF THE FIGURES

FIG. 1 illustrates the intake of Delphinol® increases glucose uptake in skin-related cells, which nourishes cells and increases their viability, further leading to the maintenance of a healthy skin.

FIG. 2 illustrates the beneficial effects on sensitive skin conditions with the use of Delphinol®.

FIG. 3 illustrates anti-inflammatory action upon immunostimulation of fibroblast with the use of Delphinol®.

FIG. 4 illustrates that Delphinol® demonstrated a strong and dose-dependent inhibitory effect on MMP-1 enzyme in vitro, thus may have a potential beneficial effect on the maintenance of skin elasticity.

FIG. 5 illustrates that Delphinol® dose-dependently inhibited typrosinase activity and lowers melanin production.

The subject may be suffering from a skin defect or skin disease or may be susceptible or predisposed to such a defect or disease. The following terms defines said diseases according to the invention:

Dermatitis, also known as eczema, is a group of diseases that results in inflammation of the skin. These diseases are characterized by itchiness, red skin and a rash.

In particular atopic dermatitis (neurodermatitis) is a multifactorial inflammatory skin disease resulting from interactions between genetic susceptibility and environmental factors.

Dermatitis solaris is caused by UV-irradiation inducing local inflammation and primary hyperalgesia.

The term dermatitis shall also refer to allergic contact dermatitis, irritant contact dermatitis and stasis dermatitis.

Lichen planus is a chronic inflammatory disease that affects the squamous cell layer, including the skin and mucosal membranes.

Lupus erythematosus is a systemic autoimmune disease from the collagenosis group. A particular characteristic of SLE (systemic lupus erythematosus) is the so-called butterfly rash. Anyway, inflammation is involved.

Psoriasis is a disease process driven by overproduction of inflammatory mediators released by innate and adaptive immune cells.

Scabies is one of the three most common inflamed skin disorders in children caused by infection.

Urticaria is defined as a disease characterized by the development of recurrent itchy wheals and/or angioedema occurring for 6 weeks or more.

All mentioned diseases and defects are well described in Pschyrembel (e.g. https://www.pschyrembel.de/).

The maqui berry extract may enhance the rate or extent of healing of the disease. The extract or composition may promote skin healing or regeneration.

The defect or disease may be acute or chronic. Those skilled in the art will readily appreciate the scope of defects and diseases to which the embodiments disclosed herein relate, being those in which the healing, the repair of damaged or otherwise defective or inflamed skin, or the regeneration of skin is desirable or advantageous. In a preferred embodiment, said defects and diseases are preferably selected from the group of dermatitis, atopic dermatitis (neurodermatitis), dermatitis solaris, eczema, hand eczema, lichen planus, lupus erythematosus, psoriasis, urticaria, itching, scabies, age spot, freckles and dry/atopic skin of humans.

Therefore, an approach, especially regarding antioxidative and anti-inflammatory protection of maqui berry extract, is important for primary prevention of the skin, which may in turn lower the risk and improve the healing procedures of the defect or disease. Moreover, it is advantageously that maqui berry extract shows specific anti-inflammatory effects as depicted in the examples, in particular the mediation via IL-8.

The maqui berry extract can be obtained by means of water/alcohol and other solvents based on each obtained fraction from a raw material (fruits and berries). Such methods are well known in the state of the art.

The aqueous/alcoholic extraction agent is used in the ratio of 40:60 (v/v) to 60:40 (v/v), in particular 41:59 (v/v), or 50:50 (v/v).

In particular ethanol, in particular 96% ethanol, is used as alcohol.

In a preferred embodiment the maqui berry extract is enriched with anthocyanins (containing sugar), in particular delphinidin glycoside (so called delphinidins) as an active substance. In particular, the maqui berry extract is enriched with delphinidin-3-sambubioside-5-glucoside, delphinidin-3,5-diglucoside, delphinidin-3-sambubioside or delphinidin-3-glucoside. Moreover, delphinidin-3-O-galactoside, delphinidin 3-O-glucoside, cyanidin-3-O-galactoside, delphinidin-3-O-arabinoside, cyanidin-3-O-glucoside, petunidin-3-O-galactoside, petunidin-3-O-glucoside, cyanidin-3-O-arabinoside, peonidin-3-O-galactoside, petunidin-3-O-arabinoside, malvidin-3-O-galactoside, peonidin-3-O-glucoside, malvidin-3-O-glucoside, peonidin-3-O-arabinose, malvidin-3-O-arabinose are preferred compounds of the maqui berry extract.

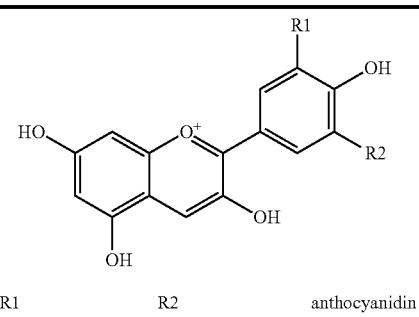

| R1 | R2 | anthocyanidin |
|---|---|---|
| OH | OH | delphinidin |
| OH | H | cyanidin |
| H | H | pelargonidin |
| OCH$_3$ | H | peonidin |
| OCH$_3$ | OH | petunidin |
| OCH$_3$ | OCH$_3$ | malvidin |

FIG. A—some anthocyanidin (sugar free)

In a preferred embodiment the maqui berry extract can be obtained by the following steps:
 a) providing a crude extract of a plant material,
 b) filtering said crude extract;
 c) contacting said crude extract with a polystyrene resin, wherein said resin adsorbs said anthocyanins;
 d) washing said resin; and
 e) eluting said anthocyanins from, said polystyrene resin to obtain a composition enriched for anthocyanins.

Hence, the present invention refers to a maqui berry extract standardized comprising a minimum of 25% delphinidins (w/w) and a minimum of 35% total anthocyanins (w/w).

In a preferred embodiment is maqui berry extract the primary active ingredient.

"Primary active ingredient" shall mean that, in addition to other active ingredients, the active ingredient maqui berry extract is present in a predominant quantity in the composition according to the invention.

As used herein the terms "treating" and "treatment" or "preventing" and "prevention" refer to any and all uses which remedy a condition or symptoms, prevent the establishment of a condition or disease, or otherwise prevent, hinder, retard, or reverse the progression of a condition or disease or other undesirable symptoms in any way whatsoever. Thus, the terms "treating" and "treatment" or "preventing" and "prevention" are to be considered in their broadest context. For example, treatment does not necessarily imply that a subject is treated until total recovery.

As used herein the term "subject" includes humans and animals. Typically, the subject is a human, or a patient.

Preferably, the maqui berry extract is formulated as a pharmaceutical composition comprising in addition one or more pharmaceutically acceptable carriers or diluents.

The medicinal drugs that are manufactured with maqui berry extract in accordance with the invention can be administered preferably orally beside parenterally, topically, intramuscularly, peri-articularly, intra-articularly, intravenously, intraperotoneally, subcutaneously, or rectally. The invention pertains to processes for the manufacture of medicinal drugs that are characterized by the feature that maqui berry extract according to the invention is/are brought into a suitable form of agent for administration together with a pharmaceutically suitable and physiologically tolerated vehicle and, optionally, further suitable active substances, additives, or ancillary substances. Suitable solid or liquid galenic forms of preparation or formulations are, for example, granulated materials, powders, sugar-coated pills, tablets, (micro)capsules, suppositories, syrups, juices, suspensions, emulsions, drops, or injectable solutions as well as preparations with a protracted release of the active substance, whereby use is made in their preparation of conventional ancillary substances, such as vehicle substances, agents that lead to the disintegration of the preparation, binders, coating agents, swelling agents, slippage promoting agents or lubricants, taste improving agents, sweeteners, and solubilizers. Mention may be made of the following as ancillary substances: magnesium carbonate, titanium dioxide, lactose, mannitol and other sugars, talcum, milk protein, gelatine, starch, cellulose and its derivatives, animal and vegetable oils such as cod-liver oil, sun flower oil, groundnut oil or sesame oil, poly(ethylene glycols), and solvents such as, for example, sterile water and monohydric or polyhydric alcohols, e.g. glycerine.

When the maqui berry extract is used in the preparation of pharmaceutical drugs, it may be administered in any form conveniently employed for oral or parenteral administration, such as injections (emulsifiable, suspendable, non-aqueous, etc.), or solid injections emulsified or suspended prior to use, transfusion solutions, powders, granules, tablets, capsules, enteric coated tablets, troches, liquid for internal use, suspensions, emulsions, syrups, liquids for external use, fomentations, nasal drops, inhalants, ointments, lotions, suppositories, enteral nutrients, etc. It may be used either alone or in combinations depending on the disease conditions. These may be prepared according to the conventional methods by adding to the main drug pharmacologically and pharmaceutically acceptable adjuvants for manufacture.

The medicinal drugs are preferably manufactured and administered in dosage units, whereby each unit contains, as the active component, a defined dose of the maqui berry extract according to the invention. In the case of solid dosage units, such as tablets, capsules, sugar-coated pills or suppositories, this dose can amount to 1 to 1000 mg and preferably 50 to 300 mg, and in the case of injection solutions in ampoule form, this dose can amount to 0.3 to 300 mg and preferably 10 to 100 mg.

Daily doses of 20 to 1000 mg of active substance, and preferably 100 to 500 mg of active substance, are indicated for the treatment of an adult patient weighing 50 to 100 kg, e.g. 70 kg. However, higher or lower daily doses can also be applied under certain circumstances. The administration of the daily dose can take place via an administration on one single occasion in the form of an individual dosage unit or several smaller dosage units, or via the multiple administration of subdivided doses at defined intervals.

In the following, the present invention is described in more detail by way of examples. However, these examples are not intended to limit the scope of protection of the present invention in any way.

The examples also refer to several figures, the legends of which are given below:

EXAMPLES

Delphinol®, also under the brand name Maquisupreme®, is a highly water-soluble powdery extract of maqui berries produced under GMP conditions by Anklam Extrakt GmbH, Germany. Delphinol® is standardized to contain a minimum of 25% delphinidins and a minimum of 35% total anthocyanins.

Example 1

Effects of Delphinol® on Glucose Utilization of Cells.

Cultured keratinocytes (HaCaT cells; aneuploid immortal keratinocyte cell line from adult human skin) were labelled with 2-NBDG (2-[N-(7-nitrobenz-2-oxa-1,3-diazol-4-yl) amino]-2-deoxy-D-glucose and treated with Delphinol® or the positive control (rosiglitazone) for 24 h. Fluorescence was measured and data are analysed by the total green object integrated intensity. The fluorescence of rosiglitazone was taken as 100% of glucose uptake, and the glucose uptake is calculated as (% glucose uptake)=100(T−B)/(P−B), where T (treated) is the fluorescence of Delphinor-treated cells, B (basal) is the fluorescence of 2-NBDG cells and P (positive control) is the fluorescence of cells treated with rosiglitazone. As a result, Delphinol® induced glucose uptake in keratinocytes at the highest concentration tested. Thus, intake of Delphinol® increases glucose uptake in skin-related cells, which nourishes cells and increases their viability, further leading to the maintenance of a healthy skin (FIG. 1).

Example 2

Delphinol® Shows Potent TRPV1 Antagonistic Activity.

Cultured 293T-VR1 were incubated with Delphinol® and then stimulated with the agonist capsaicin for 3 h. Capsazepine was used as positive control of TRPV-1 antagonism. Cellular viability was measured after 3 h of stimulation by live cell imaging. As a result, at higher concentrations Delphinor-treatment elucidated high viability to capsaicin-treated cells, reflecting potent agonistic activity on TRPV1 receptor. The TRPV1 receptor (capsaicin receptor) is known to promote sensation of heat and pain (nociception) and can detect and regulate body temperature. Blocking TRPV1 receptor is an interesting approach for the treatment of sensitive skin. Therefore, Delphinol® might exhibit anti-itching as well as anti-pain effects on sensitive skin (FIG. 2).

Example 3

Delphinol® Demonstrates Anti-Inflammatory Action.

Primary normal human dermal fibroblasts (NHDF) were incubated with IL-1beta (cell stimulation) in presence of Delphinol® for 24 h. 24 h after cell stimulation supernatants of cell cultures were investigated for pro-inflammatory cytokines IL-6 and IL-8 by ELISA technique. Delphinol® showed inhibitory effects for of the IL-1beta induced IL-6 release in NHDF with 10 µg/ml and 100 µg/ml treatment. Additionally, Delphinol® exhibited strong inhibition of IL-8 release in NHDF in a dose-dependent manner (FIG. 3).

Example 4

Delphinol® Exhibits Inhibitory Effects on Collagen-Degrading Enzyme MMP-1

HaCaT keratinocytes were cultured and stimulated with PolyIC in presence of Delphinol® for 24 h. 24 h after cell stimulation supernatants were removed and investigated for MMP-1 concentrations by ELISA. Delphinol® demonstrated a strong and dose-dependent inhibitory effect on MMP-1 enzyme in vitro, thus may have a potential beneficial effect on the maintenance of skin elasticity (FIG. 4).

Example 5

Delphinol® Affects Tyrosinase Activity and Lowers Melanin Production In Vitro

To determine tyrosinase activity in B16 melanoma cells, cells were treated with Delphinol® or Kojic acid (as positive control) for 72 h. After cell lysation supernatants were incubated with L-dopa (melanin pre-cursor) for 2 h and tyrosinase activity measured photometrically at 485 nm. To investigate melanogenesis B16 cells were treated for 3 days with Delphinol®, then washed with phosphate bufferd saline at the end of the treatment and dissolved in NaOH containing 10% DMSO for 1 h at 60° C. Measurement of melanin via photometry at 405 nm. As a result, Delphinol® dose-dependently inhibited tyrosinase activity that could be confirmed in reduced melanin production. Therefore, Delphinol® might be useful in the treatment of age-spot or freckles (FIG. 5).

The invention claimed is:

1. A method of treating an inflamed skin condition comprising administering to a subject in need thereof a medicament or dietary supplement comprising maqui berry extract, wherein the maqui berry extract comprises a minimum of 25% (w/w) delphinidins and a minimum of 35% (w/w) anthocyanins, and wherein the extract is obtained by the following steps:
   a) providing a crude extract of a plant material,
   b) filtering said crude extract;
   c) contacting said crude extract with an adsorbent, wherein said adsorbent, in particular resin adsorbs said anthocyanins;
   d) washing said adsorbent; and
   e) eluting said anthocyanins from said adsorbent to obtain a composition enriched for anthocyanins;
   wherein the skin condition is selected from the group consisting of itching, lichen planus, lupus erythematosus, scabies, and urticaria.

2. The method according to claim 1, wherein the skin condition is itching.

3. The method according to claim 1, wherein the maqui berry extract is obtained by an aqueous/alcoholic extraction agent, in 40:60 (v/v) to 60:40 (v/v).

4. The method according to claim 1, wherein the maqui berry extract is obtained by an aqueous/alcoholic extraction agent, in 41:59 (v/v), or 50:50 (v/v).

5. The method according to claim 3, wherein the alcoholic extraction agent is ethanol.

6. The method according to claim 4, wherein the alcoholic extraction agent is 96% ethanol.

7. The method according to claim 1, wherein water is used for step d.) and ethanol is used for step e.).

8. The method according to claim 6, wherein water is used for step d.) and ethanol is used for step e.).

9. The method according to claim 1, wherein the plant material of step a.) is selected from fruits and/or berries.

10. The method according to claim 8, wherein the plant material of step a.) is selected from fruits and/or berries.

11. The method according to claim 1, wherein said adsorbent of steps c.) to d.) is a resin.

12. The method according to claim 10, wherein said adsorbent of steps c.) to d.) is a polymer resin.

13. The method according to claim 1, wherein said adsorbent of steps c.) to d.) is a polystyrene resin.

14. The method according to claim 1, wherein the medicament or dietary supplement is a pharmaceutical preparation, where applicable including suitable carrier substances, and in the form of dragées, tablets, film-coated tablets, powders, capsules or liquid dilutions, drops, juices, syrups, ointments, emulsions, granulates, powders, nasal sprays, liquid or solid preparations for inhalation, compresses, wound and gum dressings, tamponades, tonsil paint solutions, gargling solutions, rinsing solutions, injections, transfusion solutions, granules, enteric coated tablets, troches, suspensions, fomentations, nasal drops, inhalants, lotions, suppositories or enteral nutrients.

* * * * *